(12) United States Patent
Villa

(10) Patent No.: US 10,960,975 B1
(45) Date of Patent: Mar. 30, 2021

(54) VERTICAL TAKE-OFF AND LANDING (VTOL) AIRCRAFT NOISE SIGNATURE MITIGATION

(71) Applicant: Uber Technologies, Inc., San Francisco, CA (US)

(72) Inventor: Ian Villa, San Francisco, CA (US)

(*) Notice: Subject to any disclaimer, the term of this patent is extended or adjusted under 35 U.S.C. 154(b) by 232 days.

(21) Appl. No.: 16/276,425

(22) Filed: Feb. 14, 2019

Related U.S. Application Data

(60) Provisional application No. 62/668,176, filed on May 7, 2018, provisional application No. 62/668,745, filed on May 8, 2018.

(51) Int. Cl.
| | | |
|---|---|---|
| *B64C 29/00* | (2006.01) | |
| *G08G 5/00* | (2006.01) | |
| *G01C 21/34* | (2006.01) | |
| *G05D 1/02* | (2020.01) | |
| *G05D 1/10* | (2006.01) | |
| *G01C 21/20* | (2006.01) | |

(52) U.S. Cl.
CPC ...... *B64C 29/0016* (2013.01); *G01C 21/3461* (2013.01); *G05D 1/0202* (2013.01); *G08G 5/0039* (2013.01); *B64C 29/0033* (2013.01); *B64C 2220/00* (2013.01); *G01C 21/20* (2013.01); *G05D 1/102* (2013.01); *G10K 2210/1281* (2013.01); *G10K 2210/3016* (2013.01); *G10K 2210/30231* (2013.01)

(58) Field of Classification Search
CPC ............ B64C 29/0016; B64C 29/0033; B64C 2220/00; G05D 1/102; G05D 1/0202; G10K 2210/1281; G10K 2210/30231; G10K 2210/3016; G01C 21/20; G01C 21/3461; G08G 5/0039
See application file for complete search history.

(56) References Cited

U.S. PATENT DOCUMENTS

| | | | |
|---|---|---|---|
| 8,311,686 B2* | 11/2012 | Herkes ................. | G01H 17/00 701/3 |
| 9,802,702 B1* | 10/2017 | Beckman ............. | B64C 39/024 |
| 2010/0079342 A1* | 4/2010 | Smith .................. | G01H 17/00 342/451 |

(Continued)

FOREIGN PATENT DOCUMENTS

JP 2013-86795 A * 5/2013 ........... G05D 1/0653

*Primary Examiner* — Michael J Zanelli
(74) *Attorney, Agent, or Firm* — Dority & Manning, P.A.

(57) ABSTRACT

Vertical take-off and landing (VTOL) aircraft can provide opportunities to incorporate aerial transportation into transportation networks for cities and metropolitan areas. However, VTOL aircraft may be noisy. To accommodate this, the aircraft may utilize onboard sensors, offboard sensing, network, and predictive temporal data for noise signature mitigation. By building a composite understanding of real data offboard the aircraft, the aircraft can make adjustments to the way it is flying and verify this against a predicted noise signature (via computational methods) to reduce environmental impact. This might be realized via a change in translative speed, propeller speed, or choices in propulsor usage (e.g., a quiet propulsor vs. a high thrust, noisier propulsor). These noise mitigation actions may also be decided at the network level rather than the vehicle level to balance concerns across a city and relieve computing constraints on the aircraft.

20 Claims, 7 Drawing Sheets

(56) References Cited

U.S. PATENT DOCUMENTS

2018/0053425 A1* 2/2018 Adler ................ G08G 5/0021
2018/0354636 A1* 12/2018 Darnell ................ B64D 33/06
2019/0221127 A1* 7/2019 Shannon .......... G06Q 10/06313

* cited by examiner

VERTICAL TAKE-OFF AND LANDING (VTOL) AIRCRAFT NOISE SIGNATURE MITIGATION

CROSS-REFERENCE TO RELATED APPLICATIONS

This application claims priority under 35 U.S.C. § 119(e) to U.S. Provisional Patent Application Ser. No. 62/668,176, titled "Dynamic Aircraft Routing," filed May 7, 2018, and U.S. Provisional Patent Application Ser. No. 62/668,745, also titled "Dynamic Aircraft Routing," filed May 8, 2018. The subject matter of these applications are incorporated by reference.

BACKGROUND

The present disclosure relates to aviation transport, and specifically, to vertical take-off and landing (VTOL) aircraft noise signature mitigation.

There is generally a wide variety of modes of transport available within cities. People may walk, ride a bike, drive a car, take public transit, use a ride sharing service, and the like. However, as population densities and demand for land increase, many cities are increasingly experiencing problems with traffic congestion and the associated pollution. Consequently, there is a need to expand the available modes of transport in ways that may reduce the amount of traffic without requiring the use of large amounts of land.

Air travel within cities has been limited compared to ground travel. Air travel can have a number of requirements making intra-city air travel difficult. For instance, aircraft can require significant resources such as fuel and infrastructure (e.g., runways), produce significant noise, and require significant time for boarding and alighting, each presenting technical challenges for achieving larger volume of air travel within cities or between neighboring cities. However, providing such air travel may reduce travel time over purely ground-based approaches as well as alleviate problems associated with traffic congestion.

Vertical take-off and landing (VTOL) aircraft provide opportunities to incorporate aerial transportation into transport networks for cities and metropolitan areas. VTOL aircraft require much less space to take-off and land relative to traditional aircraft. In addition, developments in battery technology have made electric VTOL aircraft technically and commercially viable. Electric VTOL aircraft may be quieter than aircraft using other power sources, which further increases their viability for use in built-up areas where noise may be a concern.

However, VTOL aircraft create noise and may fly through areas in which the perceived acceptable noise level is low, such as residential areas. Thus, with an increase in demand for viable modes of transportation, a method for mitigating noise signatures of VTOL is desired.

SUMMARY

Embodiments relate to noise signature mitigation for vertical take-off and landing (VTOL) aircraft. A request including a starting vertiport location and an ending vertiport location is received. Noise signatures of available aircraft are accessed. An aircraft is selected based on the noise signatures of the available aircraft. Map data of a geographic region including the starting vertiport location and the ending vertiport location is accessed. A route between the starting vertiport location and the ending vertiport location is determined. Real-time noise data generated by one or more sensors is accessed. A desired change in the noise signature of the aircraft is determined. A message with instructions to modify the operations of the aircraft based on the desired change in the noise signature of the aircraft is transmitted to the aircraft.

Figure 1:
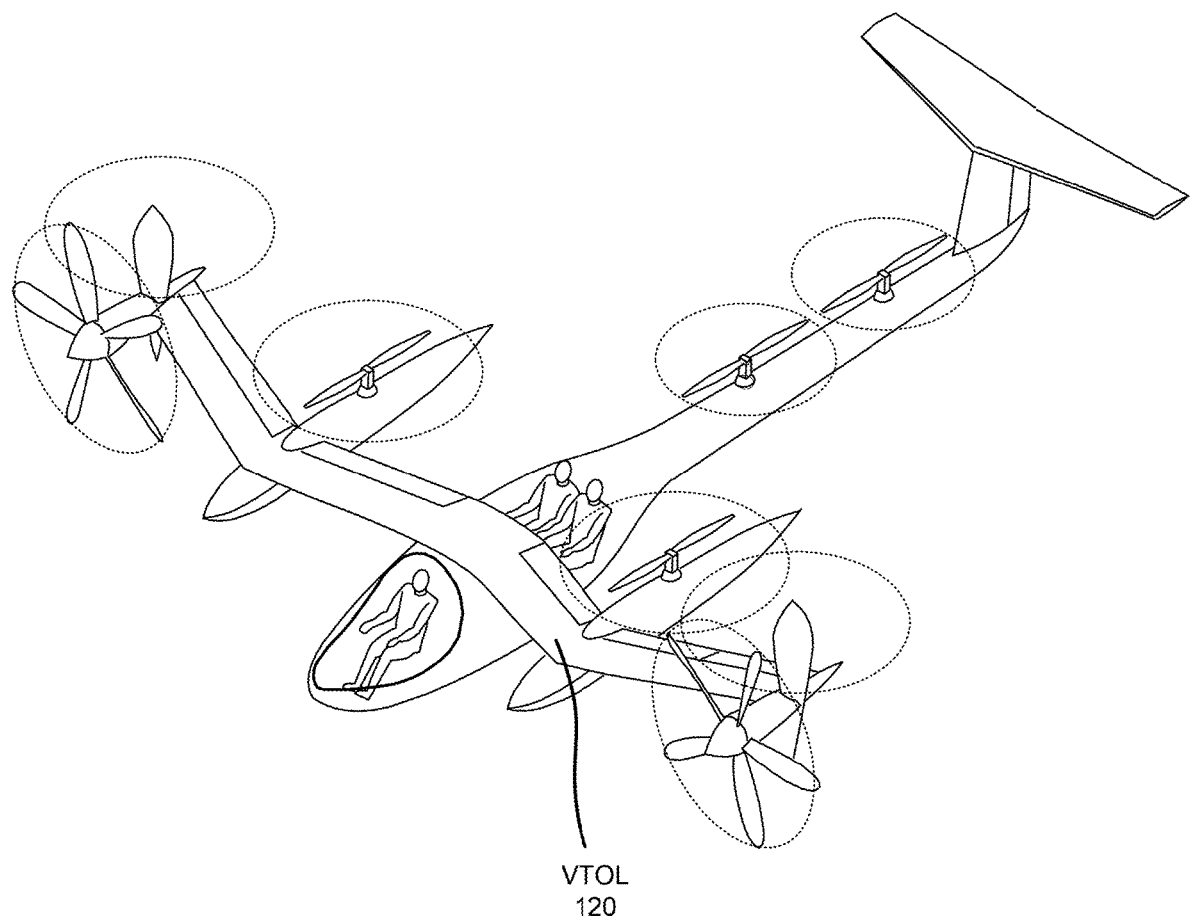
FIG. 1 illustrates an electric VTOL aircraft, according to an embodiment.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Embodiments of the present disclosure relate to real-time mitigation of an aircraft's noise signature and perceived noise impact by observers using onboard sensing, network data, and/or temporal noise data at a geolocation.

A transport network coordination system may determine optimal trips or trajectories for air vehicles to fly. Part of determining optimality is reducing the impact of the vehicle's noise signature on the environment the vehicle flies over. While the vehicle may utilize onboard sensors to determine its noise impact, a vehicle may also utilize offboard sensing, network, and predictive temporal data for noise signature mitigation. By building a composite understanding of real data offboard the aircraft, the aircraft can make adjustments to the way it is flying and verify this against a predicted noise signature (via computational methods) to reduce environmental impact. This might be realized via a change in translative speed, propeller speed, choices in propulsor usage (e.g., a quiet propulsor vs. a high thrust, noisier propulsor), etc. These noise mitigation actions may also be considered at the network (or sub-network) level to balance noise levels across a city and relieve computing constraints on the aircraft.

Various approaches may be used to understand noise levels around vertiports. In one embodiment, a method for location-based noise collection for the purpose of characterizing a vertiport's noise signature and quantifying community acceptance includes data collection enabled by microphones within a distance from the vertiport and processed by the network to filter for data quality, relative location, and directionality of collection.

In other embodiments, a distributed array of sensors is used to gather operational data. This array can cover various communication bands and may be composed of sonic, ultrasonic, IR, LIDAR, lighting, barometric, humidity, temperature, camera, and radar systems. This array solution can be distributed across a vertiport to support a multitude of use cases and in various geographic locations. Moreover, in one embodiment, the array is modular and may allow integration across different vertiport types to support low and high throughput.

The data collected by the array may enable improved landing and/or takeoff at a vertiport by an aircraft given microclimate weather conditions and an understanding of in-operation aircraft controllability in various flight modes. The data collected by the array may also be used in mitigating the overall noise signature of a vertiport. In one embodiment, this is achieved through the alteration of operations via changes in throughput, routing, aircraft selected for landing/departure, etc. This can be enabled through real noise data (e.g., collected via the vertiport, adjacent aircraft, ground based infrastructure, ground observers, or ground vehicles) or estimated noise data (analyzed via computational aerodynamics/aeroacoustics/perception). In some embodiments, real and estimated noise data can be combined for composite understandings.

Example VTOL Aircraft

FIG. 1 illustrates an electric VTOL aircraft 120, according to an embodiment. In the embodiment shown in FIG. 1, the VTOL aircraft 120 is a battery-powered aircraft that transitions from a vertical take-off and landing state with stacked lift propellers to a cruise state on fixed wings.

The VTOL aircraft 120 has an M-wing configuration such that the leading edge of each wing is located at an approximate midpoint of the wing. The wingspan of a VTOL aircraft 120 includes a cruise propeller at the end of each wing, a stacked wing propeller attached to each wing boom behind the middle of the wing, and wing control surfaces spanning the trailing edge of each wing. At the center of the wingspan is a fuselage with a passenger compartment that may be used to transport passengers and/or cargo. The VTOL aircraft 120 further includes two stacked tail propellers attached to the fuselage tail boom.

During vertical assent of the VTOL aircraft 120, rotating wingtip propellers on the nacelles are pitched upward at a 90-degree angle and stacked lift propellers are deployed from the wing and tail booms to provide lift. The hinged control surfaces tilt to control rotation about the vertical axis during takeoff. As the VTOL aircraft 120 transitions to a cruise configuration, the nacelles rotate downward to a zero-degree position such that the wingtip propellers are able to provide forward thrust. Control surfaces return to a neutral position with the wings, tail boom, and tail, and the stacked lift propellers stop rotating and retract into cavities in the wing booms and tail boom to reduce drag during forward flight.

During transition to a descent configuration, the stacked propellers are redeployed from the wing booms and tail boom and begin to rotate along the wings and tail to generate the lift required for descent. The nacelles rotate back upward to a 90-degree position and provide both thrust and lift during the transition. The hinged control surfaces on the wings are pitched downward to avoid the propeller wake, and the hinged surfaces on the tail boom and tail tilt for yaw control.

Example System Environment

Figure 2:
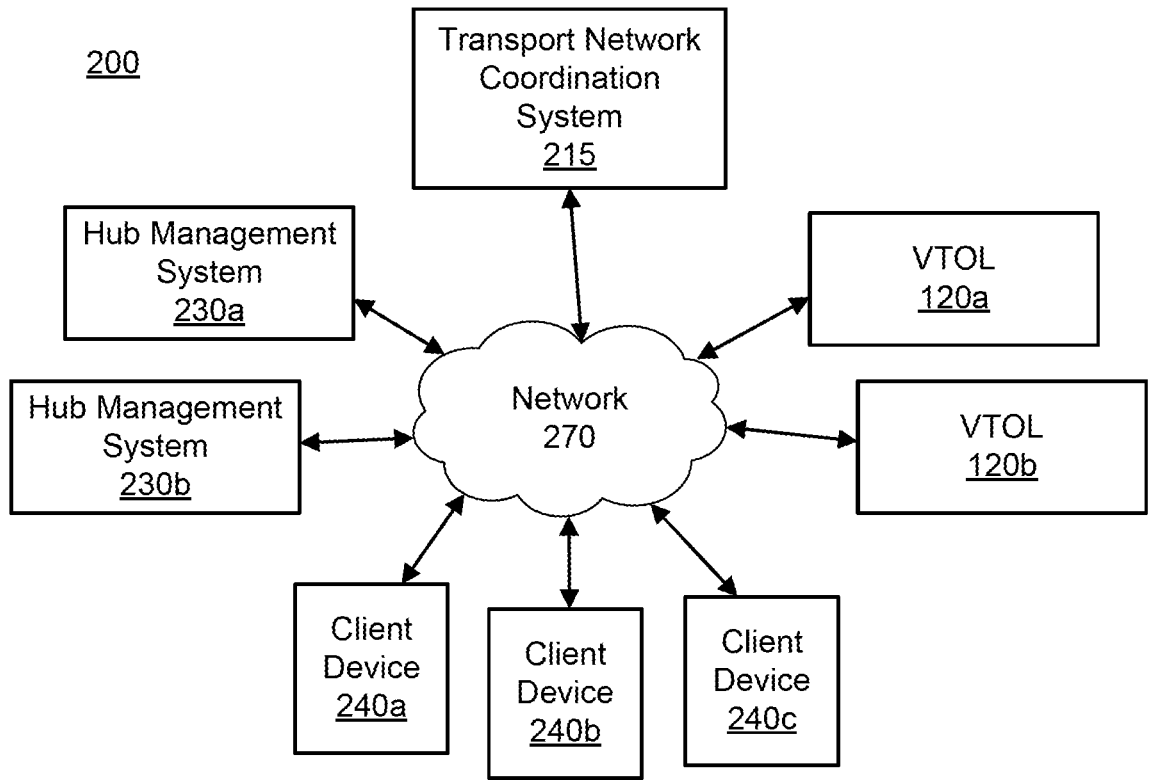
FIG. 2 illustrates a computing environment associated with an aviation transport network, according to an embodiment.

FIG. 2 illustrates one embodiment of a computing environment 200 associated with an aviation transport network. In the embodiment shown in FIG. 2, the computing environment 200 includes a transport network coordination system 215, a set of VTOL aircraft 120a, 120b, a set of hub management systems 230a, 230b, and a set of client devices 240a, 240b, all connected via a network 270.

When multiple instances of a type of entity are depicted and distinguished by a letter after the corresponding reference numeral, such entities shall be referred to herein by the reference numeral alone unless a distinction between two different entities of the same type is being drawn. In other embodiments, the computing environment 200 contains different and/or additional elements. In addition, the functions may be distributed among the elements in a different manner than described. For example, the hub management systems 230 may be omitted with information about the hubs stored and updated at the transport network planning system 210.

The transport network coordination system 215 determines an optimal route for transport services by a VTOL aircraft 120 from a first hub to a second hub and provides routing information to the VTOL aircraft 120, including what time to leave a first hub, which hub to fly to after departure, way points along the route, how long to spend charging before departure from the first hub or upon arrival at the second hub, and the identity of individuals to carry. The transport network coordination system 215 may also direct certain VTOL aircraft 120 to fly between hubs without riders to improve fleet distribution (referred to as "deadheading"). Various embodiments of the transport network coordination system 215 are described in greater detail below, with reference to FIG. 3.

The transport network coordination system 215 is further configured as a communicative interface between the various entities of the computing environment 200 and is one means for performing this function. The transport network coordination system 215 is configured to receive sets of service data representing requests for transportation services from the client devices 240 and creates corresponding service records in a transportation data store (not shown). In some embodiments, the request for transportation services from the client devices 240 includes an origin hub and a destination hub. According to an example, a service record corresponding to a set of service data can include or be associated with a service ID, a user ID, an origin hub, a destination hub, a service type, pricing information and/or a status indicating that the corresponding service data has not been processed. The transport network coordination system 215 accesses noise signatures of available VTOL aircraft 120 and selects a VTOL aircraft 120 based on the noise signatures of the available VTOL aircraft 120 to provide the transportation service to the user. In one embodiment, when the transport network coordination system 215 selects a VTOL aircraft 120 to provide the transportation service to the user, the service record can be updated with information about the VTOL aircraft 120 as well as the time the request for service was assigned.

The VTOL aircraft 120 are vehicles that fly between hubs in the transport network. A VTOL aircraft 120 may be controlled by a human pilot (inside the vehicle or on the ground) or it may be autonomous. In one embodiment, the VTOL aircraft 120 are battery-powered aircraft that use a set of propellers for horizontal and vertical thrust, such as the VTOL aircraft shown in FIG. 1. The configuration of the propellers enables the VTOL aircraft 120 to take-off and land vertically (or substantially vertically). For convenience, the various components of the computing environment 200 will be described with reference to this embodiment. However, other types of aircraft may be used, such as helicopters, planes that take-off at angles other than vertical, and the like. The term VTOL should be construed to include such vehicles. Optionally or alternatively, the terms CTOL (conventional take-off and landing) and/or STOL (short take-off and landing) should be construed to include such vehicles.

A VTOL aircraft 120 may include a computer system that communicates status information (e.g., via the network 270) to other elements of the computing environment 200. The status information may include current location, planned route, current battery charge, potential component failures, information describing operations of the aircraft, and the like. The computer system of the VTOL aircraft 120 may also receive information, such as routing and weather information and information regarding the current location and planned routes of VTOL aircraft 120 in the vicinity of the VTOL aircraft 120. In some embodiments, the computer system of the VTOL aircraft 120 receives real-time noise data generated by one or more sensors via the network 270. The real-time noise data may be received periodically at an interval (e.g., 59 minutes as part of an hourly update). Although two VTOL aircraft 120 are shown in FIG. 2, a transport network can include any number of VTOL aircraft 120.

Hub management systems 230 provide functionality at vertiport locations, or hubs, in the transport network. A hub is a location at which VTOL aircraft 120 are intended to take off and land. Within a transport network, there may be different types of hub. For example, a hub in a central location with a large amount of rider throughput might include sufficient infrastructure for sixteen (or more) VTOL aircraft 120 to simultaneously (or almost simultaneously) take off or land. Similarly, such a hub might include multiple charging stations for recharging battery-powered VTOL aircraft 120. In contrast, a hub located in a sparsely populated suburb might include infrastructure for a single VTOL aircraft 120 and have no charging station. The hub management system 230 may be located at the hub or remotely and be connected via the network 270. In the latter case, a single hub management system 230 may serve multiple hubs. Ambient noise levels at and around the hub in the central location may be larger than noise levels at and around the hub located in the sparely populated suburb.

In one embodiment, a hub management system 230 monitors the status of equipment at the hub and reports to the transport network planning system 210. For example, if there is a fault in a charging station, the hub management system 230 may automatically report that it is unavailable for charging VTOL aircraft 220 and request maintenance or a replacement. The hub management system 230 may also control equipment at the hub. For example, in one embodiment, a hub includes one or more launch pads that may move from a takeoff/landing position to embarking/disembarking position. The hub management system 230 may control the movement of the launch pad (e.g., in response to instructions received from transport network coordination system 215 and/or a VTOL aircraft 220).

The client devices 240 are computing devices with which users may arrange transport services within the transport network. Although three client devices 240 are shown in FIG. 2, in practice, there may be many more (e.g., thousands or millions of) client devices connected to the network 270. In one embodiment, the client devices 240 are mobile devices (e.g., smartphones, tablets, etc.) running an application for arranging transport services. A user provides a pickup location and destination within the application and the client device 240 sends a request for transport services to the transport services coordination system 215. In some embodiments, the request for transport services includes an origin hub and a destination hub. Alternatively, the user may provide a destination and the pickup location is determined based on the user's current location (e.g., as determined from GPS data for the client device 240).

The network 270 provides the communication channels via which the other elements of the networked computing environment 200 communicate. The network 270 can include any combination of local area and/or wide area networks, using both wired and/or wireless communication systems. In one embodiment, the network 270 uses standard communications technologies and/or protocols. For example, the network 270 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 270 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 270 may be represented using any suitable format, such as hypertext markup language (HTML) or extensible markup language (XML). In some embodiments, all or some of the communication links of the network 270 may be encrypted using any suitable technique or techniques.

Transport Network Coordination

Figure 3:
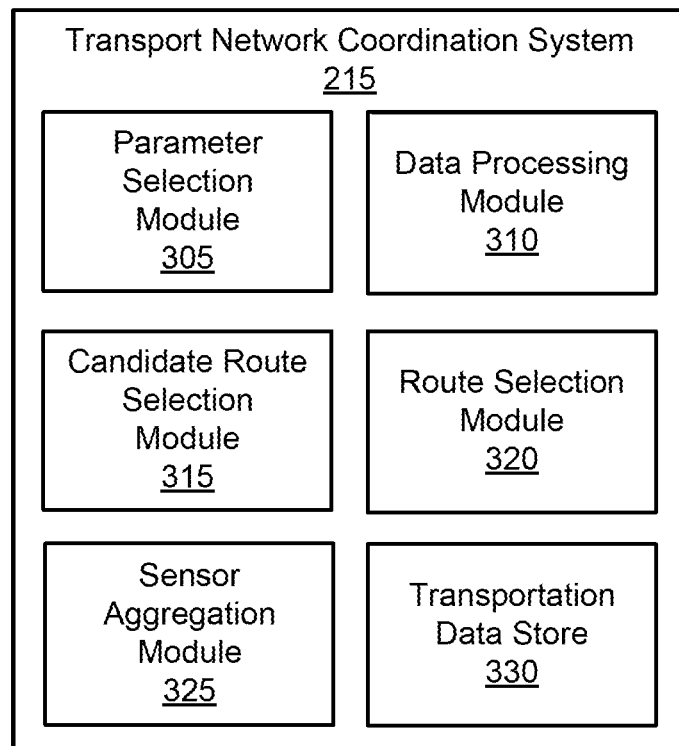
FIG. 3 illustrates the transport services coordination system, according to an embodiment.

FIG. 3 illustrates one embodiment of the transport network coordination system 215. The transport network coordination system 215 determines an optimal route for transport services by the VTOL aircraft 220 from a first hub to a second hub based on real-time noise data generated by one or more sensors and data regarding the current locations and planned routes of other VTOL aircraft 120 within a threshold distance of the VTOL aircraft 120.

In the embodiment shown in FIG. 3, the transport network coordination system 215 includes a parameter selection module 305, a data processing module 310, a candidate route selection module 315, and a route selection module 320, a sensor aggregation module 325, and a transportation data store 330. In other embodiments, the transport network coordination system 215 includes different and/or additional elements. In addition, the functions may be distributed among the elements in a different manner than described.

The parameter selection module 305 provides a user interface for defining various parameters to be used in the optimization of VTOL route selection. In one embodiment, the definable parameters include network and environmental parameters and objectives. Network and environmental parameters may include a number of VTOL aircraft 120 with a current location and/or a planned route between the first hub or the second hub, the presence and locations of VTOL hubs between and/or around the first hub and the second hub and the number and schedule of VTOL aircraft 120 intended to take-off or land at the VTOL hubs, environmental noise between the first hub and the second hub, the presence and location of other transportation hubs, current and predicted weather between and/or around the first hub and the second hub, and perceived acceptable noise levels between the first hub and the second hub. In some embodiments, the parameter selection module 305 further determines feasibility of a candidate route, energy consumption of a VTOL aircraft 120, and parameters relating to performance of a VTOL aircraft 120. Feasibility of a candidate route may be, e.g., an aggregate of the above definable parameters. The performance parameters may include, e.g., sensor data that provide insights into the health and state of a VTOL aircraft 120 as measured by an aircraft health module. The aircraft health module is described below in detail with reference to FIG. 4.

The network and environmental objectives may be to (1) avoid routes through areas in which the perceived acceptable noise level is low (e.g., residential neighborhoods), (2) coordinate travel through areas of high environmental noise (e.g., train stations) to mask noise signature, (3) avoid routes that pass within a threshold distance of other transportation hubs (e.g., airports), (4) avoid routes where the current and/or predicted weather is unfavorable (e.g., high wind gusts or forces), (5) avoid routes that pass within a threshold distance of one or more VTOL hubs, (6) avoid routes that pass within a threshold distance of planned routes for a given number of other VTOL aircraft, (7) minimize predicted travel time, (8) minimize total distance traveled, (9) minimize energy burn and power utilization, (10) increase throughput of riders, and (11) minimize damage or health impact to the aircraft and its components.

The data processing module 310 accesses network and environmental data needed to calculate candidate routes for VTOL travel based on one or more selected parameters and/or objectives. In one embodiment, the data processing module 310 queries the transport network planning system 210 to obtain data regarding the locations of VTOL hubs as well as the environmental data between the first hub and the second hub. The data processing module 310 further queries the transportation data store 330 to obtain data regarding the presence, location, and planned routes of VTOL aircraft between the first hub and the second hub. In some embodiments, the data processing module 310 queries the transportation data store 330 to obtain map data of a geographic region including the first hub and the second hub. The transport network planning system 210 and the transportation data store 330 return the requested map data to the data processing module 310, which sends the information to the candidate route selection module 315 along with the selected objectives for the route. The transportation data store 330 is one or more computer-readable media for storing transportation data, such as map data, demand data, routing information, noise data, VTOL parameters, and the like.

The candidate route selection module 315 identifies candidate routes for VTOL aircraft travel between a first hub and a second hub. In one embodiment, to determine the candidate routes, the candidate route selection module 315 computes different routes between the first hub and the second hub that each optimizes for a different parameter or combination of parameters associated with the network and environmental parameters and objectives. Each optimization function is associated with a set of optimized parameters and assigns weights to the optimized parameters such that the routing options generated by the function optimizes for parameters having higher weights relative to parameters having lower weights. For example, an optimization function assigns a higher weight to noise mitigation along a candidate route relative to the total distance traveled, and therefore, the generated routing option may avoid noise-sensitive areas (e.g., residential areas), but travel a longer distance. In other embodiments, the candidate routes between the first and second hubs are determined in other ways. For example, a network planner may manually select a set of routes between the pair of hubs (e.g., by tracing them on a map, selecting a series of waypoints, or the like). Regardless of how the candidate routes are determined, in one example embodiment, the candidate route selection module 315 stores (e.g., in a database) a set of candidate routes between each pair of hubs in the transport network 215. The candidate routes from a first hub to a second hub may be the same of different from the candidate routes from the second hub to the first hub.

The route selection module 320 selects the routes for specific VTOLs 220 traveling from a first hub to a second hub. In some embodiments, the candidate routes for specific VTOLs 220 traveling from the first hub to the second hub are substantially the same as the candidate routes from the second hub to the first hub. Alternatively, in some other embodiments, the candidate routes for specific VTOLs 220 traveling from the first hub to the second hub are different from the candidate routes from the second hub to the first hub. In one embodiment, the route selection module 320 retrieves the candidate routes from the first hub to the second hub from the candidate route selection module 315 and selects one of the candidates as the preferred route between the first hub and the second hub based on the selected network and environmental parameters and objectives. The route selection module 320 calculates a noise profile for each candidate route based on the noise generated by the VTOL aircraft 120 and other predicted noise sources along the candidate route (e.g., other VTOL aircraft, typical noise levels in the area at that time, etc.) as well as the perceived acceptable noise level in areas within a threshold distance of the candidate route. If the route selection module 320 determines that a noise profile exceeds a threshold level at any point along a candidate route, the route selection module 320 discards the candidate route as a possible option for the transport service. The route selection module 320 may modify a portion of the candidate route such that the VTOL aircraft 120 avoids the area where the noise profile exceeds the threshold level. The route selection module 320 may select the candidate route that has the earliest estimated time of arrival at the second hub and that does not exceed the threshold noise level at any point along the route. Alternatively or additionally, different network and environmental parameters and objectives may be used to select the preferred route.

The selected route is sent to the VTOL aircraft 120. In one embodiment, if the route selection module 320 determines that all of the candidate routes have noise profiles that exceed the threshold noise level, the route selection module 320 may notify the VTOL 120 that no acceptable routes currently exist for transport between the first hub and the second hub. The route selection module 320 may delay departure of the VTOL 120 and periodically (e.g., every five minutes) repeat the process until conditions have changed such that one of the candidate routes has a noise profile that does not exceed the noise threshold. Alternatively, an entirely new route/itinerary may be assigned that is actually feasible and optimal.

The sensor aggregation module 325 receives and aggregates data from various sensors. The sensors may include sonic, ultrasonic, IR, LIDAR, lighting, barometric, humidity, temperature, camera, and radar systems spread across various communication bands and in different quantities to support a variety of use cases. In some embodiments, the sensor aggregation module 325 receives and aggregates real-time noise data from an on-board sensor and one or more external sensors. The on-board sensor and the one or more external sensors may be sonic sensors such as microphones. Additionally or alternatively, the on board sensor and the one or more external sensors may be pressure sensors. The computer system of the VTOL 120 or Transport Network Coordination System 215 may use computational fluid dynamics to convert the real-time pressure data into real-time noise data. Some example use cases are described below with reference to FIG. 4.

Sensor Data Aggregation

Figure 4:
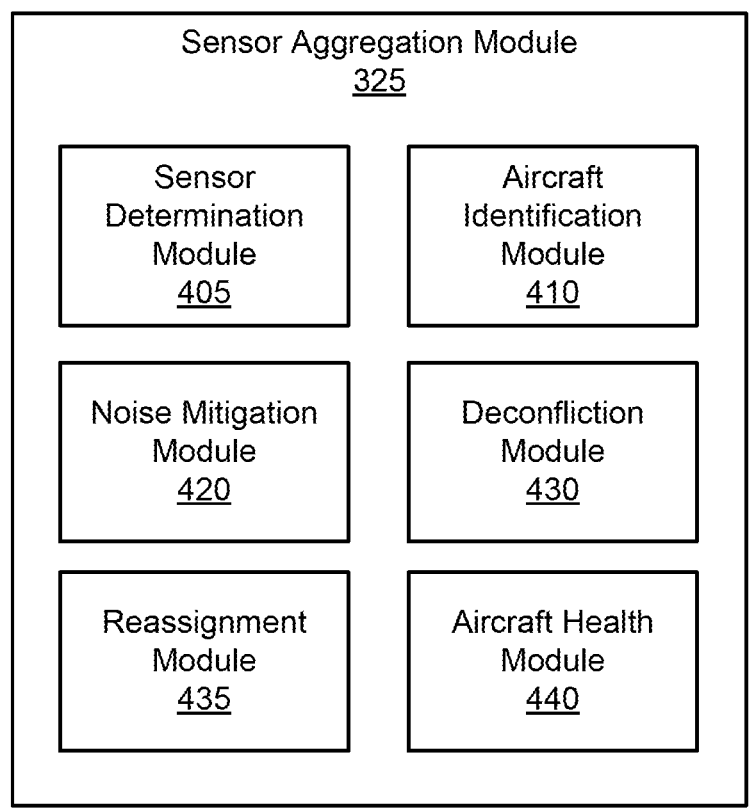
FIG. 4 illustrates the sensor aggregation module, according to an embodiment.

FIG. 4 illustrates one embodiment of the sensor aggregation module 325 shown in FIG. 3. In the embodiment shown in FIG. 4, the sensor aggregation module 325 includes a sensor determination module 405, an aircraft identification module 410, a noise mitigation module 420, a deconfliction module 430, a reassignment module 435, and an aircraft health module 440. In other embodiments, the sensor aggregation module 325 may include different and/or additional elements. Furthermore, the functionality may be distributed between components in manners different than described.

It can be desirable that a vertiport or aircraft remain aware of its noise impact and other environmental conditions. Noise and other data may be collected and aggregated by the sensor determination module 405 to enable the performance of noise mitigation and other vertiport management functions. In one embodiment, sensors are affixed or physically integrated at the vertiport and aircraft and/or data is gathered on an ad-hoc basis via microphones and/or other sensors within a geographic vicinity of the vertiport. The sensors may also be fixed to ground based infrastructure, ground vehicles, air vehicles, and/or user devices (e.g., smart phones). The sensors send collected data to the sensor determination module 405 in real-time or at intervals for appropriate sampling and/or aggregation (e.g., via the network 270).

At any given time, a data collection radius around the vertiport may be defined to determine which sensors to use for data collection relevant to the vertiport. Additionally or optionally, a data collection radius around a route may be defined to determine which sensors to use for data collection relevant to the VTOL aircraft. In the case of noise collectors (e.g., microphones), the sensors may receive a signal to turn on (if not already on) and then begin collecting noise data. This data may be processed onboard the collector initially to filter out irrelevant or irregular noise patterns before sending to the network. At the network level, additional processing may occur to generate a location-based noise or perception map which can then be made available to the vertiport to help with operational or airspace related decision-making. Alternatively, unprocessed data is sent to the network and processing occurs at the network level. In some embodiments, the data processing module 310 of the transport network coordination system 215 processes the data.

Previously collected noise data may also be utilized for smart-filtering. An understanding of temporally regular events may be used to determine whether data collection should be more or less frequent. Moreover, predicted perceived noise levels or computed acoustics due to aircraft trajectories can be utilized to better select noise collectors for adequate sampling quality and size. Throughout a day, the data collection area may be dynamically scaled to ensure that noise perception levels are not exceeded in and around the vertiport as well as the flight path while also balancing computing resources.

A distributed sensing array can be composed of sonic, ultrasonic, IR, LIDAR, lighting, barometric, humidity, temperature, camera, and radar systems spread across various communication bands and in different quantities to support a variety of use cases. Each sensor array can come equipped with adequate actuators, cleaning jets/sprays, wipers, and the like to provide continued operation in different environments and weather situations. Various use cases for sensor data are described below, with continued reference to FIG. 4.

Aircraft Identification

In day-to-day operations, it may be desirable that vertiports and any related airspace management system can identify aircraft in operation. While much of this identification can be facilitated via backend protocols, in some embodiments physical identification and confirmation of the aircraft assets may be desirable. In one embodiment, the aircraft identification (ID) module 410 receives one or more of photo, IR, LIDAR, multispectral, or radar data. The aircraft ID module processes the data to identify and track aircraft. These observations may be of the aircraft itself or artifacts of aircraft flight (e.g. photo capture of wingtip vortices characteristic of a certain aircraft type or LIDAR moisture measurements in the wake of an aircraft's flight path).

Vertiport and Aircraft Noise Mitigation

Successful day-to-day operations may include managing a noise profile at and around vertiports for community acceptance. The microphones and speakers included in a distributed sensing array may enable vertiports to quantify their noise impact at and around the vicinity. In one embodiment, the noise mitigation module 420 quantifies the impact of the vertiport on noise levels and compares a current noise signature with predicted and threshold noise signatures to act accordingly. The noise mitigation module 420 may take corrective action to reduce noise levels, such as limiting landing and takeoff for aircraft meeting a specific signature threshold. This can also result in commands or constraints conveyed from the network to the aircraft system to mitigate noise signature by specific methods such as slowing down propellers or activating different control surfaces or more generalized methods like approach, departure, and transition directions.

Successful day-to-day operations may also include managing a noise profile of an aircraft for community acceptance. One or more sensors may enable aircraft to quantify their noise impact at and around the vicinity of the aircraft. In one embodiment, the noise mitigation module 420 quantifies the impact of the aircraft on noise levels and compares a current noise signature with predicted and threshold noise signatures to act accordingly. For example, the noise mitigation module 420 periodically collects real-time noise data generated by one or more sensors (e.g., onboard sensor, offboard noise collectors, microphones, etc.) and determines a desired change in the noise signature of the aircraft. The noise mitigation module 420 may take corrective action to reduce noise levels by transmitting a message to the aircraft via the network with instructions to modify operations of the aircraft based on the desired change in the noise signature of the aircraft. Operations of the aircraft may include, e.g., propeller rotation, propeller usage, and translative speed. In some embodiments, the instructions to modify operations of the aircraft include a noise gain vector. The noise gain vector is described below in detail with reference to FIG. 5.

Airspace Deconfliction with Other Urban Aircraft Systems Service Suppliers

Some cities may have multiple operators of VTOL flights to meet different city needs. In one embodiment, the deconfliction module 430 uses data from sensor arrays to identify aircraft from these other operators (e.g., if their systems are uncommunicative or their vehicles go rogue). Combined with onboard sensors from aircraft, the vertiport sensing array data can feed data to the airspace management tool and network to determine various options for deconfliction.

Dynamic Final Approach and Takeoff (FATO) Reassignment

Depending on the combination of vertiport layout, weather conditions, wildlife concerns, and airspace environment, in some embodiments a FATO area previously allocated for landing can be switched for takeoffs and vice versa. In one embodiment, the reassignment module 435 uses data gathered from a distributed sensing array to make a determination of whether the FATO purpose be reassigned and to provide instructions accordingly to human operators, hub management systems 230, and/or VTOLs 220.

Aircraft Health Monitoring and Maintenance Data Collection

Sensor data can also provide insights into the health and state of a VTOL 220. In one embodiment, the aircraft health module 440 receives recordings of, for example, propeller rotations, multispectral imagery of composite structures, and/or IR imagery of aircraft approaching and departing the vertiport. The recordings can be compared to a 'digital twin' of the aircraft to identify potential problems. Over time, this can be used for correlative analysis and root cause determination for failures. The recordings can also be used to determine a desired change in the noise signature of the aircraft. This data can also help route vehicles at the right time to maintenance depots for inspection and tuning. Moreover, closer to inspection periods, this can help inform how vehicles are placed and located to minimize their geographic distance to the depots themselves. In some embodiments, the recordings are provided to the noise mitigation module 420 to determine a desired change in the noise signature of the aircraft.

Additionally, aircraft may be programmed to emit specific noises to indicate the state of its health. Speakers strategically placed at parking pads or in the TLOF or FATO can be programmed to actively seek these signals for proper maintenance or operational actions to take place.

Noise Mitigation Module

Figure 5:
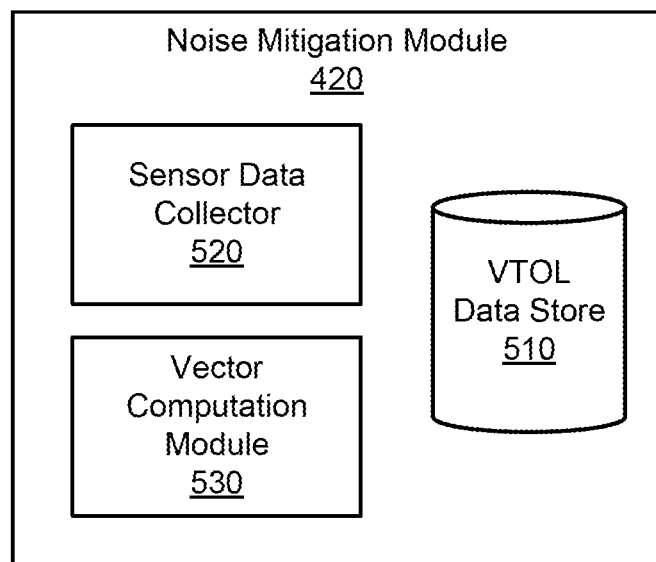
FIG. 5 illustrates the noise mitigation module, according to an embodiment.

FIG. 5 illustrates the noise mitigation module 420, according to an embodiment. The noise mitigation module includes a VTOL data store 510, a sensor data collector 520, and a vector computation module 530. In other embodiments, the noise mitigation module 420 includes different and/or additional elements. In addition, the functions may be distributed among the elements in a different manner than described.

The VTOL data store 510 is one or more computer-readable media configured to store VTOL data. The VTOL data store 510 stores VTOL data such as noise signatures of available aircraft and other data. Noise signatures of available aircraft may be based in part on, e.g., flight state, weight or payload, and environmental conditions (e.g., time of day, temperature, density). The noise signatures may also vary based on different operational modes used during different mission segments (e.g., takeoff, cruise, landing, etc.). The noise mitigation module 420 accesses the noise signatures of available aircraft from the VTOL data store 510 and selects an aircraft based on the noise signatures of the available aircraft. For example, if a candidate route would take the VTOL aircraft around a residential area with low perceived acceptable noise levels, the noise mitigation module 420 may select an aircraft with a noise signature below a threshold level. Similarly, if a candidate route avoids an area of low perceived acceptable noise level, the noise mitigation module 420 may select an aircraft with a noise signature above a threshold level or whose noise signature may be masked by ambient environmental noise to conserve aircraft with lower noise signatures. The noise signature of an aircraft may be determined by one or more sensors. While the aircraft may utilize onboard sensors to determine their noise impact, the aircraft may also utilize offboard sensing, network, and predictive temporal data for determining the noise signature. The noise mitigation module 420 may use historical noise data to build a training set and train a machine learning model (e.g., a neural network) to determine noise estimates of an aircraft. The noise data and the estimated noise data may be combined for composite understandings of the aircraft.

The sensor data collector 520 collects data from one or more sensors. In some embodiments, the one or more sensors are an onboard sensor and/or one or more offboard sensors. The onboard sensor may be part of the VTOL aircraft. The onboard sensor may be a microphone that collects real-time noise data. Alternatively, the onboard sensor may be a pressure sensor that collects real-time pressure data. The data processing module 310 may fuse computational fluid dynamics data with the real-time pressure data to estimate real-time noise data. In some other embodiments, the one or more sensors are offboard sensors. The offboard sensors may collect real noise data via vertiports, adjacent aircraft, ground based infrastructure, ground observers, ground vehicles, and the like. The sensor data collector 520 may periodically ping the aircraft at an interval to collect data. In some embodiments, the sensor data collector 520 is part of the sensor determination module 405. The sensor data collector 520 retrieves noise and other data collected and aggregated by the sensor determination module 405 to enable the performance of noise mitigation. The sensor data collector 520 may periodically ping the sensor determination module 405 at an interval to collect data (e.g., 59 minutes as part of an hourly update).

The vector computation module 530 determines one or more vectors. The vectors may include, among other components, a state matrix, a noise gain vector, and a noise control matrix.

The state matrix is a rectangular array of numbers that describes the aggregate of operations of the aircraft and other information. Operations of the aircraft include propeller rotation, propeller usage, translative speed, and the like. In some embodiments, the state matrix is based in part on the recordings received by the aircraft health module 440. In some embodiments, the state matrix is a vector.

The noise gain vector may be a scalar that is multiplied to an input (e.g., state matrix). In some embodiments, the scalar is based on a desired change in the noise signature of the aircraft.

The noise control matrix is a rectangular array of numbers that describes operations of the aircraft after the vector computation module 520 cross multiplies the state matrix and the noise gain vector. The vector computation module 520 sends a message to the aircraft with instructions to modify operations of the aircraft based on the desired change in the noise signature of the aircraft and the instructions may include the noise gain vector. In some embodiments, the noise control matrix is a vector.

Method for Vertiport Noise Signature Mitigation

Figure 6:
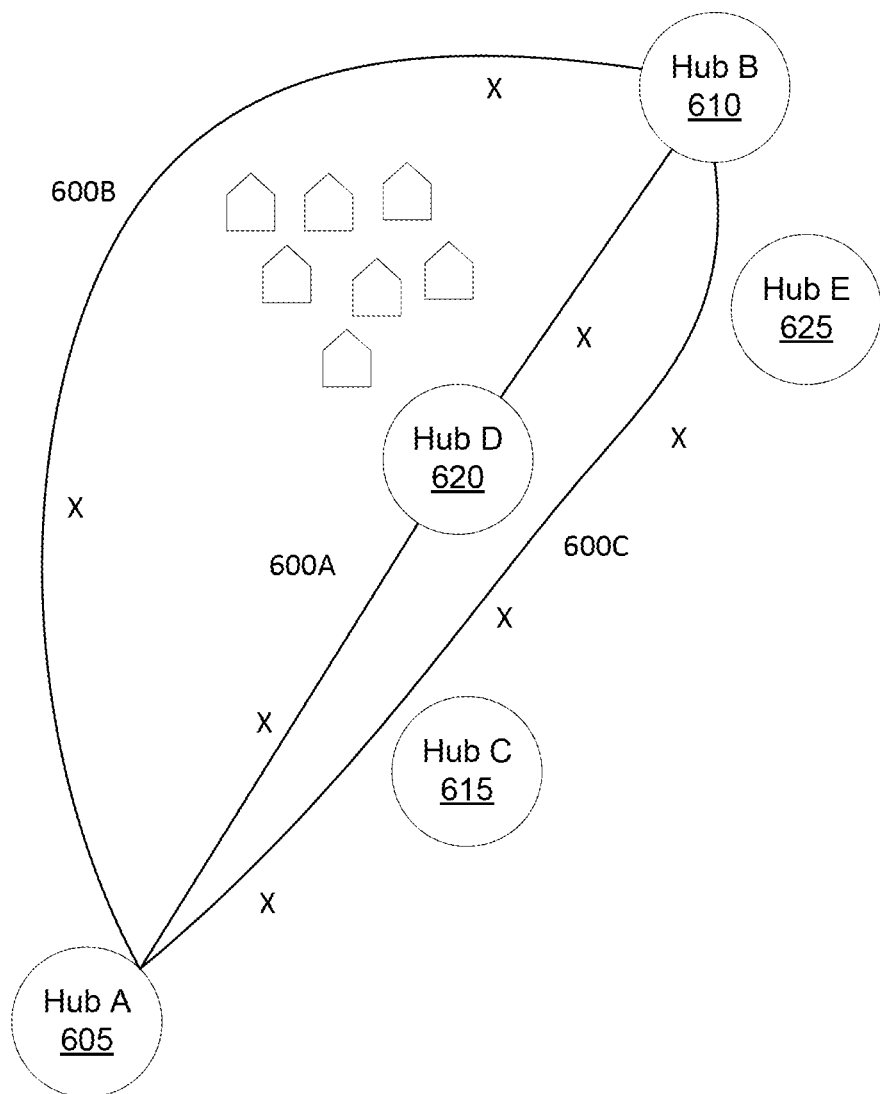
FIG. 6 illustrates candidate routes for optimal VTOL aircraft transport, according to an embodiment.

Referring to FIG. 6, a network of vertiports is defined with nodes labeled "A, B, C, D, and E" and flights between nodes denoted by connecting lines, according to one embodiment. Noise collectors exist across the geographic area and are denoted by "x." The noise collectors may be fixed or mobile. The noise collectors may include microphones for collecting real-time noise data. Alternatively, the noise collectors may include pressure sensors for collecting real-time pressure data. The pressure data may be processed onboard or on a network level to convert the real-time pressure data into real-time noise data using computational fluid dynamics and computational aeroacoustics. The noise signature of each vertiport may be visualized as non-convex polygons surrounding each node. Node B is surrounded by two such non-convex polygons to represent a potential alteration of its noise signature. The noise signature of a vertiport or aircraft can be computed regularly using a composite of distributed noise measurements.

The noise in the urban environment may be affected due to urban air mobility. Flights in and around vertiports may change perceived noise levels and it may be desirable to manage these impacts to observers at the vertiport level. Also, flights along candidate routes 600 may change perceived noise levels and it may be desirable to manage these impacts to observers at the ground level. The noise signature of a vertiport or aircraft may be managed via one or more techniques. Example techniques, which may be used alone or in combination, are described below.

In one embodiment, the overall vertiport throughput may be increased or decreased dynamically. The perceived noise level in and around the vertiport is a function of the amount of trips occurring in and around the vertiport. If the vertiport noise signature cannot be mitigated by the control of vehicles or selection of operating vehicles alone, overall throughput at the vertiport may be modified for more or less trips. In some embodiments, the vertiport noise signature is determined in real-time. Perceived noise level in and around the vertiport may be sampled over a specific time period to better understand its impact over longer intervals and as noise level varies.

In another embodiment, the vehicles routed to the vertiport are filtered based on their noise impact. Depending on current perceived noise levels, vehicles may be allowed or disallowed from landing and taking-off based on vehicle predicted operating noise signatures. When a vertiport is closer to threshold perceived noise levels, routing of quieter vehicles to and from that vertiport may become more frequent.

In a further embodiment, the approach and departure pathways for a vertiport may be changed to manage the vertiport's noise profile. Once vehicles have been selected for optimal takeoff and landing, their routing may be modified such that they do not fly over places with higher sensitivity to perceived noise. The routing may be modified in-flight based on real-time noise data to manage the aircraft's noise profile. Vehicle speeds and/or rates of climb may also be adjusted to manage the vertiport's noise profile. Once a path for vehicle has been decided, the perceived noise level impact of the vehicle (which contributes to the overall noise signature of the vertiport) can be modified by altering a vehicle's speed and/or rate of climb/descent. Operations of the vehicle such as propeller rotation, propeller usage, and translative speed may be modified to manage the vehicle's noise profile. This is because an aircraft's noise signature is a function of its pressure delta on the ambient environment which is controlled by how much it actively disturbs the air.

Exemplary Routing Configuration

FIG. 6 illustrates candidate routes for optimal VTOL aircraft transport, in accordance with an embodiment. In the embodiment shown in FIG. 6, the transport network coordination system 215 identifies candidate routes for transport between Hub A 605 and Hub B 610. Each candidate route 600A, 600B, and 600C is calculated based on network and environmental parameters and objectives, such as the presence and location of other VTOL hubs, current locations and planned routes of other VTOL aircraft 120, perceived acceptable noise levels, and current and predicted weather between Hub A 605 and Hub B 610. Although three candidate routes are shown in FIG. 6, more or fewer candidate routes may be calculated in other embodiments.

Candidate route 600A represents a direct line of travel between Hub A 605 and Hub B 610 such that candidate route 600A is the shortest of the candidate routes in terms of distance traveled. However, as shown in FIG. 6, candidate route 600A passes over Hub D 620. In one embodiment, therefore, if other VTOL aircraft 120 are taking off and landing at Hub D 620, candidate route 600A might not be selected as the optimal route for the transport to reduce air traffic congestion at and around Hub D.

As shown in FIG. 6, candidate route 600B would take the VTOL aircraft 120 around a residential area with low perceived acceptable noise levels to minimize the projection of noise into unwanted areas. However, candidate route 600B represents the longest total distance between Hub A 605 and Hub B 610 and might not be selected as the optimal route for the VTOL aircraft 120 if other candidate routes that satisfy selected parameters and objectives and have a shorter total distance are available.

Finally, candidate route 600C is a shorter total distance than candidate route 600B and avoids the area of low perceived acceptable noise level. Further, while candidate route 600C passes near Hub C 615 and Hub E 625, the route does not pass directly over these other VTOL hubs. Therefore, if the selected network and environmental objectives include avoiding areas in which the perceived acceptable noise level is low, avoiding routes that pass within a threshold distance of one or more VTOL hubs, and/or minimizing the total distance traveled, the candidate route selection module 315 might select candidate route 600C as the preferred route between Hub A 605 and Hub B 610.

Example Method for Noise Signature Mitigation Using Offboard Sensing Data

Figure 7:
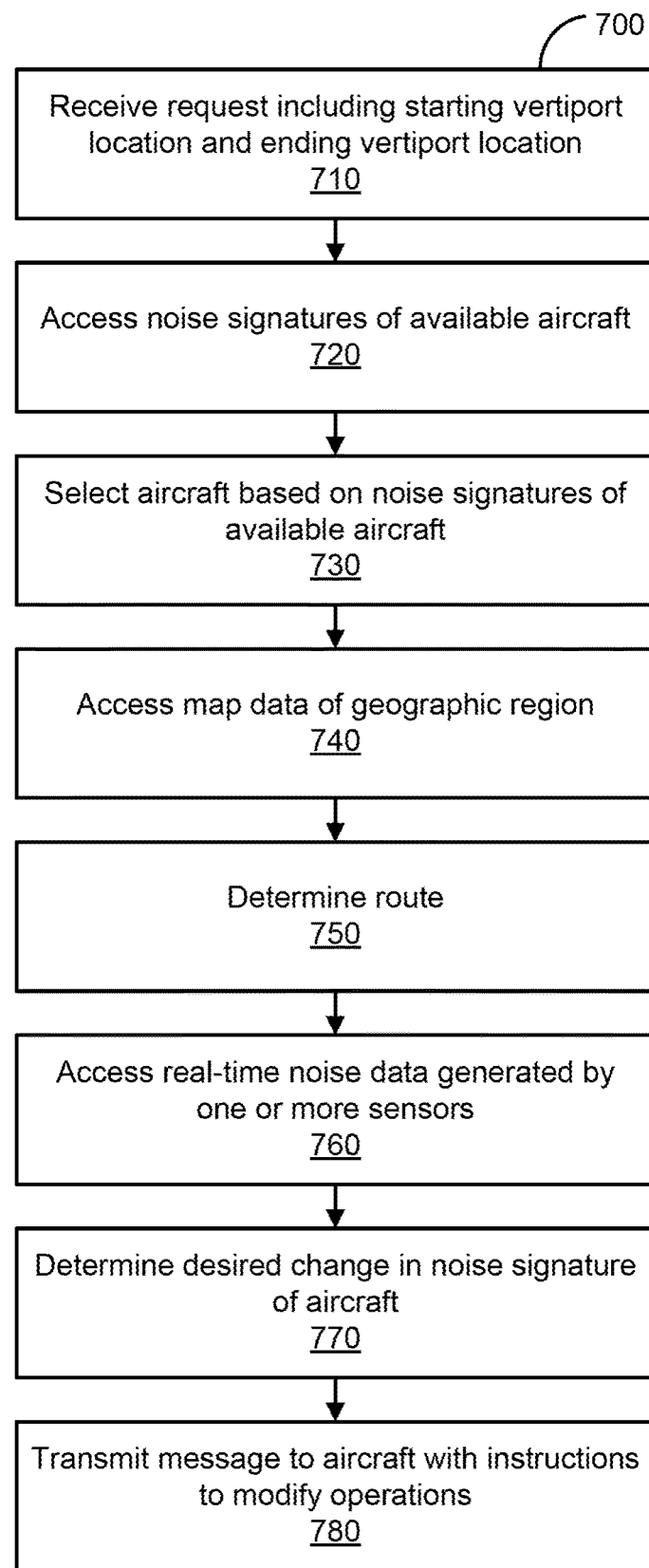
FIG. 7 is a flow chart illustrating a method for noise signature mitigation using offboard sensor data, according to an embodiment.

FIG. 7 is a flow chart illustrating a method 700 for noise signature mitigation using offboard sensing data, according to an embodiment. The steps of method 700 may be performed in different orders, and the method may include different, additional, or fewer steps.

A vertical take-off and landing (VTOL) aircraft transport request including a starting vertiport location and an ending vertiport location is received 710 from a client device. Noise signatures of available VTOL aircraft are accessed 720. The noise signatures of available VTOL aircraft may be stored in a VTOL data store and accessed by a noise mitigation module. A VTOL aircraft is selected 730 based on the noise signatures of the available VTOL aircraft. Map data of a geographic region including the starting vertiport location and the ending vertiport location is accessed 740. A route between the starting vertiport location and the ending vertiport location is determined 750. Real-time noise data generated by one or more sensors is accessed 760. A desired change in the noise signature of the aircraft is determined 770. Instructions to modify operations of the aircraft are transmitted 780 to the aircraft. The instructions may include a noise gain vector.

Computing System Architecture

Figure 8:
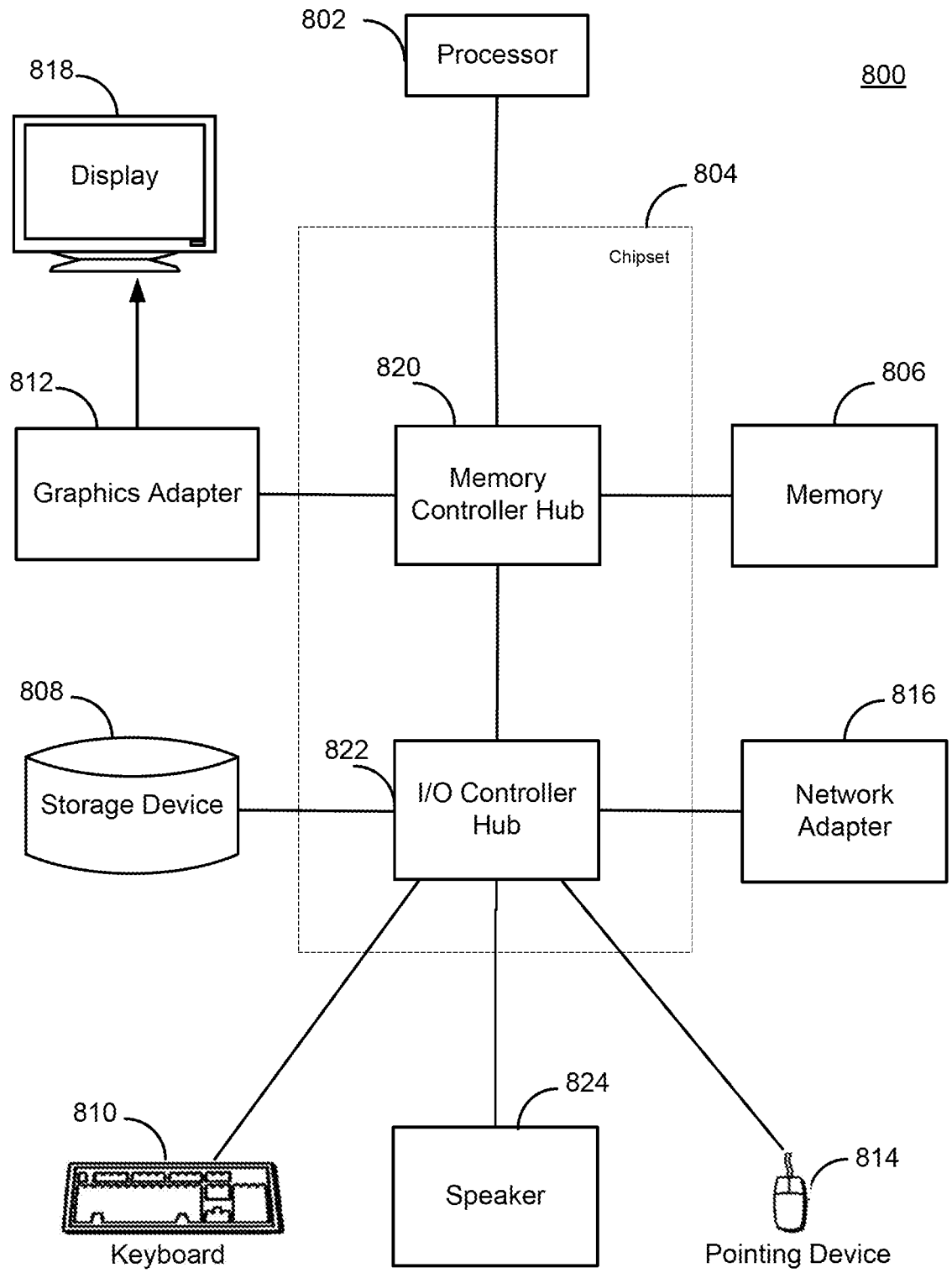
FIG. 8 is a high-level block diagram illustrating an example computer suitable for use within the computing environment, according to an embodiment.

FIG. 8 is a high-level block diagram illustrating an example computer 800 suitable for use within the computing environment 100. The example computer 800 includes at least one processor 802 coupled to a chipset 804. The chipset 804 includes a memory controller hub 820 and an input/output (I/O) controller hub 822. A memory 806 and a graphics adapter 812 are coupled to the memory controller hub 820, and a display 818 is coupled to the graphics adapter 812. A storage device 808, keyboard 810, pointing device 814, network adapter 816, and speaker 824 are coupled to the I/O controller hub 822. Other embodiments of the computer 800 have different architectures.

In the embodiment shown in FIG. 8, the storage device 808 is a non-transitory computer-readable storage medium such as a hard drive, compact disk read-only memory (CD-ROM), DVD, or a solid-state memory device. The memory 806 holds instructions and data used by the processor 802. The pointing device 814 is a mouse, track ball, touch-screen, or other type of pointing device, and is used in combination with the keyboard 810 (which may be an on-screen keyboard) to input data into the computer system 800. The graphics adapter 812 displays images and other information on the display 818. The network adapter 816 couples the computer system 800 to one or more computer networks. The speaker 824 plays auralizations of the VTOL aircraft or areas in and around the vertiport.

The types of computers used by the entities of FIGS. 1 through 8 can vary depending upon the embodiment and the processing power required by the entity. For example, the transport services coordination system 215 might include multiple computers 800 working together to provide the functionality described. Furthermore, the computers 800 can lack some of the components described above, such as keyboards 810, graphics adapters 812, and displays 818.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A computer-implemented method for aircraft noise signature mitigation, the method comprising:
   receiving a request including a starting vertiport location and an ending vertiport location;
   accessing noise signatures of available aircraft;
   selecting an aircraft based on the noise signatures of the available aircraft;
   accessing map data of a geographic region including the starting vertiport location and the ending vertiport location;
   determining a route between the starting vertiport location and the ending vertiport location;
   accessing real-time noise data generated by one or more sensors;
   determining a desired change in the noise signature of the aircraft; and
   transmitting a message to the aircraft with instructions to modify operations of the aircraft based on the desired change in the noise signature of the aircraft.

2. The computer-implemented method of claim 1, wherein at least some of the real-time noise data is from one or more microphones.

3. The computer-implemented method of claim 1, wherein real-time pressure data is measured using a pressure sensor and converted into real-time noise data using computational fluid dynamics.

4. The computer-implemented method of claim 1, wherein operations of the aircraft include propeller rotation, propeller usage, and translative speed.

5. The computer-implemented method of claim 1, wherein the real-time noise data is received periodically at an interval.

6. The computer-implemented method of claim 1 further comprising:
   adjusting the route between the starting vertiport location and the ending vertiport location in real-time based on the real-time noise data.

7. The computer-implemented method of claim 1, wherein the real-time noise data includes noise from the aircraft and noise due to external factors.

8. The computer-implemented method of claim 1, wherein the real-time noise data is aggregated from an onboard sensor and offboard sensors.

9. The computer-implemented method of claim 1, wherein determining a desired change in the noise signature of the aircraft comprises:
   determining a state vector describing operations of the aircraft,
   determining a noise gain vector, and
   determining a noise control vector based on the state vector and the noise gain vector.

10. The computer-implemented method of claim 9, wherein determining a noise control vector based on the state vector and the noise gain vector comprises taking the cross product of the state vector and the noise gain vector.

11. A non-transitory computer-readable storage medium storing executable computer program code that, when executed by one or more processors, cause the one or more processors to perform operations comprising:
    receiving a request including a starting vertiport location and an ending vertiport location;
    accessing noise signatures of available aircraft;
    selecting an aircraft based on the noise signatures of the available aircraft;
    accessing map data of a geographic region including the starting vertiport location and the ending vertiport location;
    determining a route between the starting vertiport location and the ending vertiport location;
    accessing real-time noise data generated by one or more sensors;
    determining a desired change in the noise signature of the aircraft; and
    transmitting a message to the aircraft with instructions to modify the operations of the aircraft based on the desired change in the noise signature of the aircraft.

12. The non-transitory computer-readable storage medium of claim 11, wherein at least some of the real-time noise data is from one or more microphones.

13. The non-transitory computer-readable storage medium of claim 11, wherein real-time pressure data is measured using a pressure sensor and converted into real-time noise data using computational fluid dynamics.

14. The non-transitory computer-readable storage medium of claim 11, wherein operations of the aircraft include propeller rotation, propeller usage, and translative speed.

15. The non-transitory computer-readable storage medium of claim 11, wherein the real-time noise data is received periodically at an interval.

16. The non-transitory computer-readable storage medium of claim 11 further comprising:
   adjusting the route between the starting vertiport location and the ending vertiport location in real-time based on the real-time noise data.

17. The non-transitory computer-readable storage medium of claim 11, wherein the real-time noise data includes noise from the aircraft and noise from other sources.

18. The non-transitory computer-readable storage medium of claim 11, wherein the real-time noise data is aggregated from an onboard sensor and offboard sensors.

19. The non-transitory computer-readable storage medium of claim 11, wherein determining a desired change in the noise signature of the aircraft comprises:
   determining a state vector describing operations of the aircraft,
   determining a noise gain vector, and
   determining a noise control vector based on the state vector and the noise gain vector.

20. The non-transitory computer-readable storage medium of claim 19, wherein determining a noise control vector based on the state vector and the noise gain vector comprises taking the cross product of the state vector and the noise gain vector.

\* \* \* \* \*